May 27, 1930.  W. H. ROVER  1,760,565
CHUCK STRUCTURE
Filed Oct. 24, 1927  2 Sheets-Sheet 1
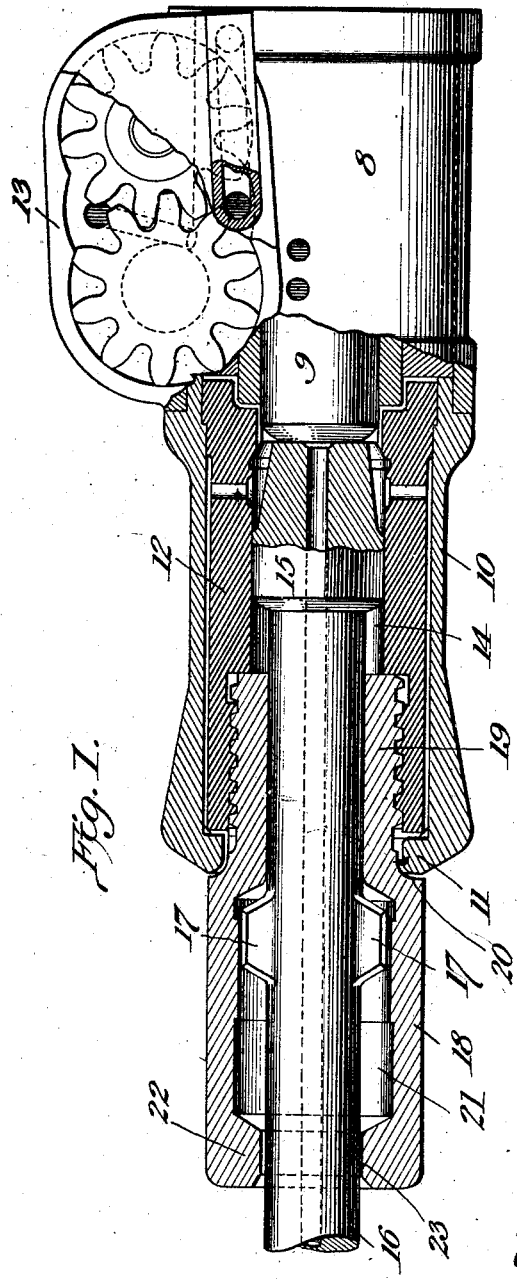
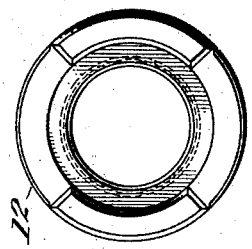
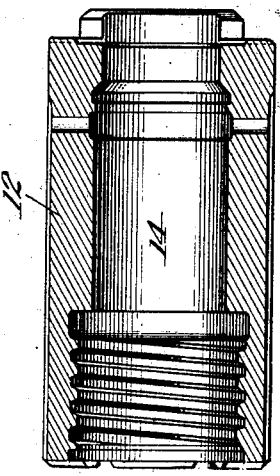
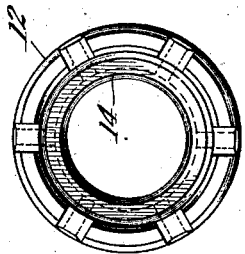
Inventor,
Walter H. Rover,
By
Attorney May 27, 1930.  W. H. ROVER  1,760,565
CHUCK STRUCTURE
Filed Oct. 24, 1927    2 Sheets-Sheet 2
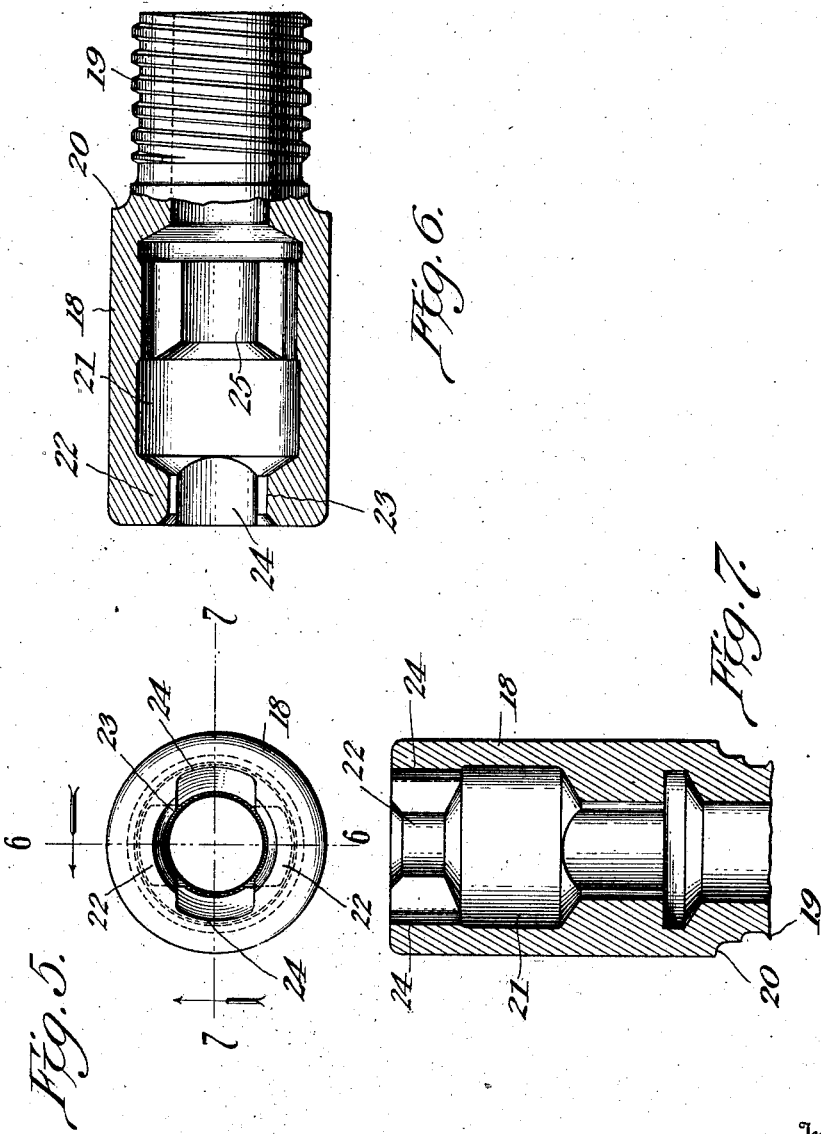

Patented May 27, 1930

1,760,565

UNITED STATES PATENT OFFICE

WALTER H. ROVER, OF DENVER, COLORADO, ASSIGNOR TO GARDNER-DENVER COMPANY, OF DENVER, COLORADO, A CORPORATION OF DELAWARE

CHUCK STRUCTURE

Application filed October 24, 1927. Serial No. 228,366.

The present invention relates to chuck structures for rock drills and the like, one object being to provide a novel structure which will permit the removal of a worn chuck and its replacement without the necessity of disassembling the chuck structure as a whole and dismounting it from the drill.

A further and important object is to so construct the chuck that it will constitute a dirt shield.

In the accompanying drawings:

Figure 1 is a longitudinal sectional view through the front portion of a drill, showing the improved chuck structure.

Figure 2 is a longitudinal sectional view of the chuck sleeve.

Figure 3 is a front elevation of said chuck sleeve.

Figure 4 is a rear elevation of the same.

Figure 5 is a front elevation of the chuck and

Figures 6 and 7 are sectional views respectively on the line 6—6 and 7—7 of Figure 5.

The front portion of the drill cylinder member is shown at 8, and operating therein is the hammer extension 9 of the hammer piston. Mounted on the front end of the part 8, is a housing 10, having an inturned flange 11 at its front open end. A chuck sleeve 12 is rotatably mounted in the housing, and is driven in a manner well understood by those skilled in the art, from a rotary motor 13.

The chuck sleeve 12 is provided with an internal chamber 14 containing a tappet 15 adapted to be struck by the hammer extension 9 of the piston and transmit a blow to the drill steel, a portion of which is shown at 16. This drill steel is provided on its shank end with lugs 17.

The drill steel is held in place by means of a chuck 18, having a reduced stem 19 at its rear end that is detachably threaded into the front end of the chuck sleeve 12. This stem 19 is thus sufficiently small in diameter to pass into the front end of the housing 10. The body of the chuck is of larger diameter than the stem 19 and extends beyond the front end of the housing. As a consequence the rear end of said body forms an annular shoulder 20 that overlies the flange 11 of the housing and serves as a dirt shield. The body 18 is provided with an internal chamber 21 having a front end wall flange 22 around a bore 23, said flange being slotted, as shown at 24 (see Figure 5). The chamber 21 is provided with internal lugs 25 that are in line with the slots 24. It will be noted that the chamber 21 and body 18 are wholly in advance of the housing 10.

As shown in Figure 1, the shank of the drill steel passes through the chuck and abuts against the tappet 15. The slots 24 are to permit the passage of the lugs 17 and the internal lugs 25 of the chuck, to engage the lugs 17 and secure the rotation of the steel with the chuck and chuck sleeve.

With this construction, when a chuck becomes worn, misshapen or injured, it can be readily removed by unscrewing the stem 19 from the chuck sleeve, the chuck sleeve, housing and other parts remaining in their assembled relation. A new chuck can be likewise screwed into the chuck sleeve. Consequently the removal and replacement of the chucks can be easily accomplished, and it will be noted that the chuck body constitutes a dirt shield that assists in preventing the ingress of dirt to the internal bearings of the tool.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim is:

1. A chuck structure for rock drills and the like, comprising a front housing, a chuck sleeve in the housing, said housing having an inturned portion overlying the front end of the sleeve, and a chuck removable from the front end of the housing and overlying the inturned portion thereof, said chuck having a portion extending into the housing and detachably interlocked with the sleeve, said chuck having a tool-receiving chamber.

2. A chuck structure for rock drills and the like, comprising a front housing, a chuck sleeve in the housing, and a chuck having a detachable interlocking engagement with the sleeve within the housing and projecting from the front end of the housing, said chuck having a tool-receiving chamber that is provided with internal tool abutment lugs located in the portion of the chuck that is outside the housing.

3. A chuck structure for rock drills and the like, comprising a tubular housing having an open front end and an inturned flange at said front end, a chuck sleeve in the housing behind the flange and having an internally threaded front end, and a chuck having a body in front of the housing and forming a dirt shield that overlies the front end of the housing, said body having a reduced threaded end that enters the front end of the housing and is screwed into the chuck sleeve, and said body being provided with a tool receiving chamber having internal abutment lugs for engagement with the lugs of a drill stell shank entered into said chamber.

4. A chuck structure for rock drills and the like, comprising a front housing, a chuck sleeve in the housing, said housing having an inturned portion overlying the front end of the sleeve, and a chuck connected to the sleeve and having a body in front of the housing, said body forming a dirt shield overlying the inturned end of the housing, and said chuck body having a tool-receiving chamber.

In testimony whereof, I affix my signature.
WALTER H. ROVER.